US010236672B2

United States Patent
Tan et al.

(10) Patent No.: US 10,236,672 B2
(45) Date of Patent: Mar. 19, 2019

(54) DRY POWER CABLE TERMINATION

(71) Applicant: Tyco Electronics (Shanghai) Co. Ltd., Shanghai (CN)

(72) Inventors: Yuezhong Tan, Shanghai (CN); Lizhang Yang, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 0 days.

(21) Appl. No.: 15/412,705

(22) Filed: Jan. 23, 2017

(65) Prior Publication Data

US 2017/0207617 A1    Jul. 20, 2017

Related U.S. Application Data

(63) Continuation of application No. PCT/IB2015/055418, filed on Jul. 17, 2015.

(30) Foreign Application Priority Data

Jul. 23, 2014   (CN) .......................... 2014 1 0353109

(51) Int. Cl.
    *H01R 4/00*     (2006.01)
    *H02G 15/064*   (2006.01)
    (Continued)

(52) U.S. Cl.
    CPC .......... *H02G 15/064* (2013.01); *H01R 4/308* (2013.01); *H01R 4/68* (2013.01); *H01R 13/527* (2013.01); *H01R 13/53* (2013.01); *H01R 13/748* (2013.01)

(58) Field of Classification Search
    CPC ........ H02G 4/308; H02G 4/68; H02G 15/064; H02G 15/068; H01R 4/308; H01R 4/468; H01R 13/527; H01R 13/53; H01R 13/748
    (Continued)

(56) References Cited

U.S. PATENT DOCUMENTS 3,198,877 A * 8/1965 Olson .................... H01B 17/30
                                                      174/189
3,767,835 A * 10/1973 Engelhardt ............ H02G 15/10
                                                      165/104.21
(Continued)

FOREIGN PATENT DOCUMENTS

EP            0732791       *  3/1996
EP            0732791  A1      9/1996
WO       WO2012/159681       * 11/2012  ............. H02G 15/04

OTHER PUBLICATIONS

International Search Report and Written Opinion of the International Searching Authority, dated Oct. 26, 2015, 12 pages.

*Primary Examiner* — William H Mayo, III
(74) *Attorney, Agent, or Firm* — Barley Snyder

(57) ABSTRACT

A dry power cable termination has an insulation sleeve, a silicone rubber tube and a stress control cone. The insulation sleeve has an inlet and an outlet. The silicone rubber tube is disposed over an exterior of the insulation sleeve; and the stress control cone is received within the insulation sleeve. Additionally, the dry power cable termination has a shielding sleeve, an electrode, an-electric connection assembly and a clamping pipe. The shielding sleeve is received within the insulation sleeve and fitted over an exposed segment of an insulation layer of the power cable. The electrode is received within the insulation sleeve and is electrically connected to a first end of the shielding sleeve. The electric connection assembly is received within the insulation sleeve and electrically connects a second end of the shielding sleeve opposite to the first to an exposed segment of a conductor core of the-power cable.

20 Claims, 3 Drawing Sheets

(51) Int. Cl.
  *H01R 4/68* (2006.01)
  *H01R 13/53* (2006.01)
  *H01R 4/30* (2006.01)
  *H01R 13/527* (2006.01)
  *H01R 13/74* (2006.01)

(58) Field of Classification Search
  USPC ....... 174/74 R, 73.1, 84 R, 85, 89, 88 C, 78, 174/115
  See application file for complete search history.

(56) References Cited

U.S. PATENT DOCUMENTS

| | | | | |
|---|---|---|---|---|
| 5,316,492 A * | 5/1994 | Schaareman | ........ | H02G 15/184 174/73.1 |
| 6,074,229 A * | 6/2000 | Johansson | .............. | H02G 15/06 439/181 |
| 6,265,663 B1 * | 7/2001 | Cicogna | ................. | H02G 15/06 174/73.1 |
| 6,333,462 B1 * | 12/2001 | Quaggia | ................ | H02G 15/06 174/73.1 |
| 6,818,828 B2 * | 11/2004 | Quaggia | .............. | H02G 15/068 174/73.1 |
| 8,525,025 B2 * | 9/2013 | Li | ........................... | H01R 9/05 174/73.1 |
| 2003/0003802 A1 * | 1/2003 | Amerpohl | .............. | H02G 15/06 439/587 |
| 2006/0124339 A1 * | 6/2006 | Goehlich | ............. | H02G 15/003 174/74 R |
| 2008/0029289 A1 * | 2/2008 | Amerpohl | ........... | H02G 15/064 174/73.1 |
| 2012/0193142 A1 * | 8/2012 | Mori | .................... | H02G 15/064 174/75 R |
| 2014/0076624 A1 | 3/2014 | Bohlin et al. | | |
| 2014/0182878 A1 * | 7/2014 | Quaggia | ................ | H02G 15/06 174/73.1 |

* cited by examiner

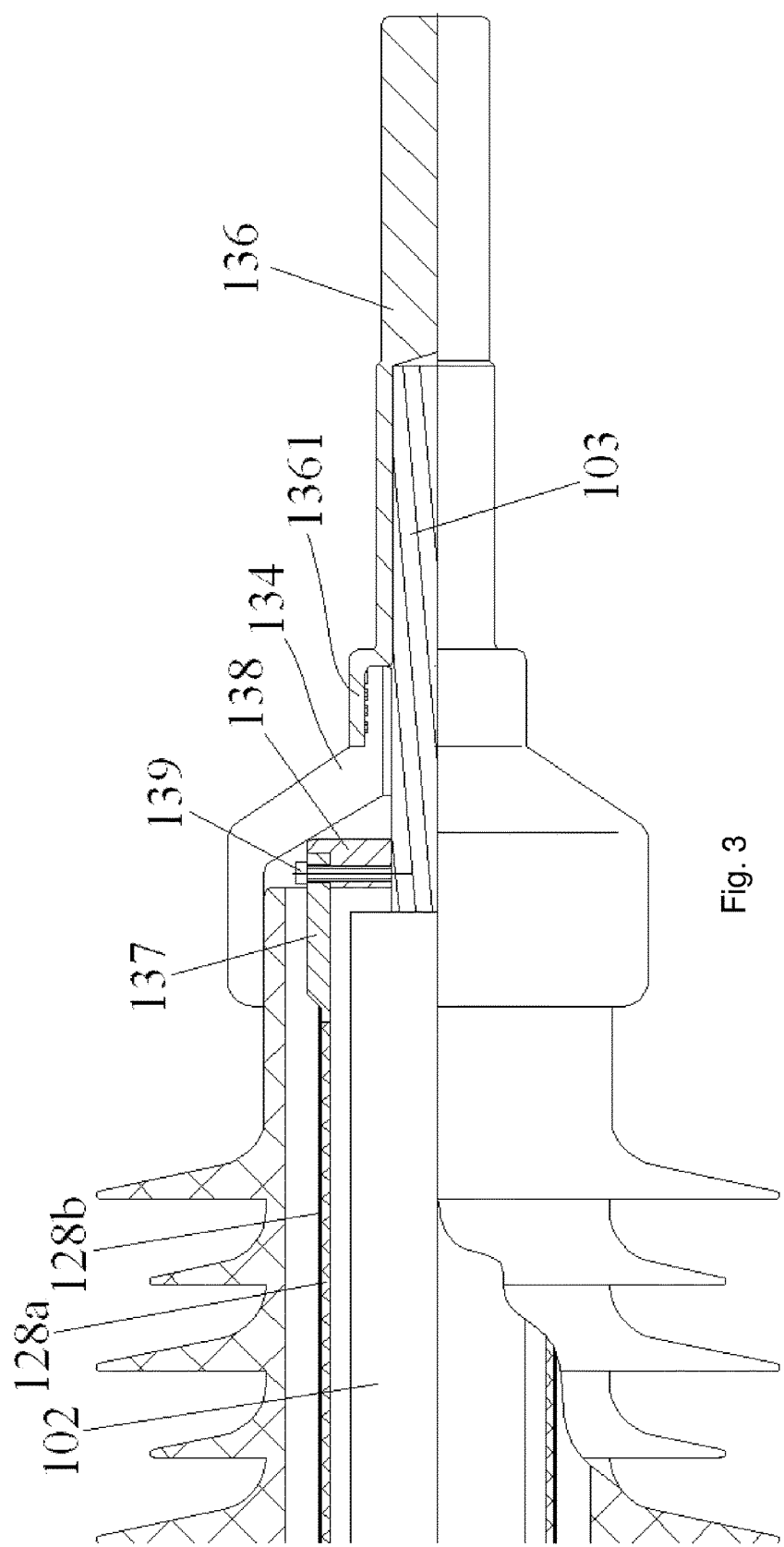

DRY POWER CABLE TERMINATION

CROSS-REFERENCE TO RELATED APPLICATION

This application is a continuation of PCT International Application No. PCT/IB2015/055418 filed Jul. 17, 2015.

FIELD OF THE INVENTION

The invention relates electrical connectors and more particularly to a dry termination for a High-Voltage power cable.

BACKGROUND

With development of the power constructions, the requirement for the High-Voltage power cable is increasing gradually. The High-Voltage accessory (dry power cable termination) mating with the High-Voltage power cable has been widely used. The formats for High-Voltage dry power cable termination products emerge in endless stream; however, the products have been divided into two types, i.e. a sleeve-type termination and a fully-preformed dry termination.

The sleeve-type termination generally has the following characters: 1. the installation thereof is complicated and time-consuming; 2. a quite long insulation layer of the cable should be processed during the installation; 3. the explosion-proof performance is poor and the operator and the devices are likely to be hurt during the explosion; 4. The quality of the installation is affected by multiple factors; 5. the insulation medium inside the sleeve readily leaks out.

The fully-preformed dry termination generally has the following characters: 1. the installation thereof is considerably simple; 2. a short insulation layer of the cable needs to be processed during the installation; 3. the explosion-proof performance is quite good; 4. the quality of the installation is affected by very few factors; 5. no insulation medium will leak out; 6. the price thereof is quite high due to two connection-pegs contained therein, a relatively long copper rod located at an upper portion thereof and multiple insulators located at an lower portion thereof.

As compared with the sleeve-type termination, apart from the high price, the fully-preformed dry termination out-matches the sleeve-type termination in other aspects. However, in High-Voltage field, the sleeve-type termination is frequently used since the fully-preformed dry termination is too expensive.

Thus, in order commonly make use of the fully-preformed dry termination in the field of High-Voltage power cable, the cost of the fully-preformed dry termination have to be reduced, which is a urgent technical problem.

In prior arts, the fully-preformed dry termination comprises a relatively long copper rod which is electrically connected to a conductor core of the power cable inserted into the fully-preformed dry termination through a copper connection-peg. Furthermore, an installation substrate for the fully-preformed dry termination is provided with four insulators, which all render the cost of the fully-preformed dry termination quite high.

SUMMARY

The present invention has been made to address at least one aspect of the above mentioned disadvantages.

Accordingly, it is an object of the present invention, among other objects, to provide a cheap dry power cable termination.

According to an aspect of the present invention, there is provided a dry power cable termination having an insulation sleeve, a silicone rubber tube and a stress control cone. The insulation sleeve has an inlet and an outlet opposite to the inlet. The silicone rubber tube is disposed over an exterior of the insulation sleeve; and the stress control cone is received within the insulation sleeve. A power cable is inserted from the inlet of the insulation sleeve and extends out from the outlet of the insulation sleeve. The stress control cone is fitted over the power cable so as to prevent a local electric field concentration from occurring at a cutting end surface formed after cutting a shielding layer of the power cable.

The dry power cable termination furthermore has a shielding sleeve, an electrode, an electric connection assembly and a clamping pipe. The shielding sleeve is received within the insulation sleeve and fitted over an exposed segment of an insulation layer of the power cable. The electrode is received within the insulation sleeve and is electrically connected to a first end of the shielding sleeve, so as to prevent a local electric field concentration from occurring at the first end of the shielding sleeve. The electric connection assembly is received within the insulation sleeve and used to electrically connect a second end of the shielding sleeve opposite to the first end to an exposed segment of a conductor core of the power cable and the clamping pipe is clamped over the conductor core of the power cable extending out from the outlet of the insulation sleeve.

BRIEF DESCRIPTION OF THE DRAWINGS

The above and other features of the present invention will become more apparent by describing in detail exemplary embodiments thereof with reference to the accompanying drawings, in which:

FIG. 3 is an enlarged illustrative view of an upper structure of the dry power cable termination of FIG. 1.

DETAILED DESCRIPTION OF EMBODIMENT(S)

Figure 1:
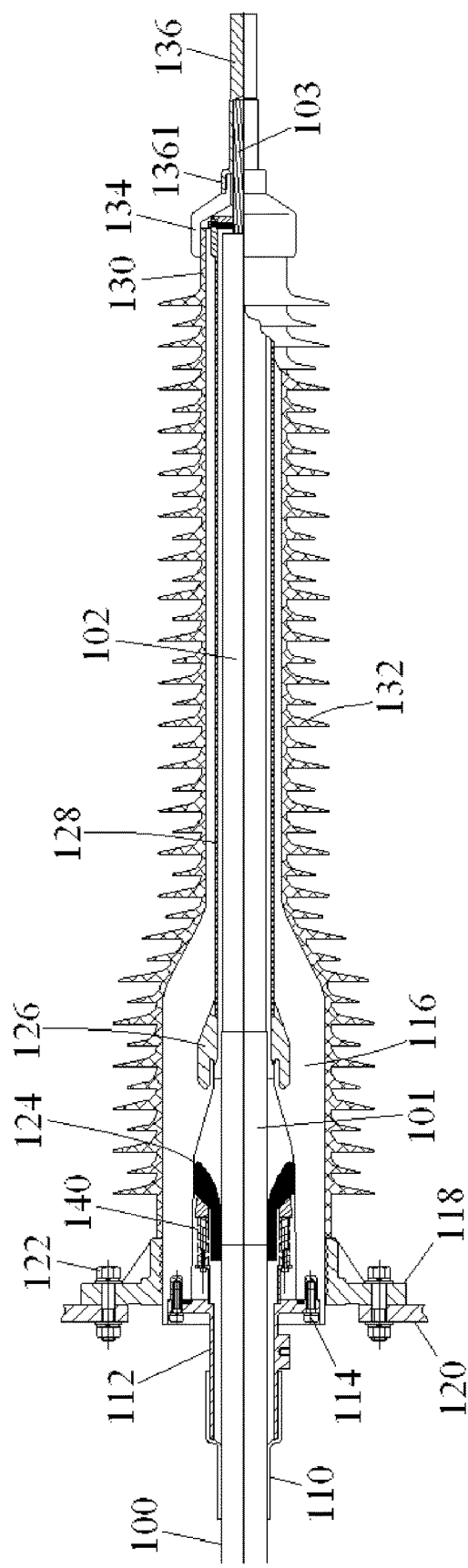
FIG. 1 is an illustrative structural view of the dry power cable termination according to an exemplary embodiment of the present invention.

Exemplary embodiments of the invention will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided a dry power cable termination, comprising: an insulation sleeve having an inlet and an outlet opposite to the inlet; a silicone rubber tube disposed over an exterior of the insulation sleeve; and a stress control cone received within the insulation sleeve. A power cable is inserted from the inlet of the insulation sleeve and extends out from the outlet of the insulation sleeve; the stress control cone is fitted over the power cable so as to prevent a local electric field concentration from occurring at a cutting end surface formed after cutting a shielding layer of the power cable. the dry power cable termination further comprises: a shielding sleeve received within the insulation sleeve and fitted over an exposed segment of an insulation layer of the power cable; an electrode received within the insulation sleeve and electrically connected to a first end of the shielding sleeve, so as to prevent a local electric field concentration from occurring at the first end of the shielding sleeve; an electric connection assembly received within the insulation sleeve and used to electrically connect a second end of the shielding sleeve opposite to the first end to a exposed segment of a conductor core of the power cable; and a clamping pipe clamped over the conductor core of the power cable extending out from the outlet of the insulation sleeve.

FIG. 1 is an illustrative structural view of a dry power cable termination according to an exemplary embodiment of the present invention.

As illustrated in FIG. 1, in an exemplary embodiment of the present invention, the dry power cable termination comprises an insulation sleeve 116, a silicone rubber tube 130 and a stress control cone 124. The insulation sleeve 116 has an inlet (a bottom opening in FIG. 1) and an outlet (a top opening in FIG. 1) opposite to the inlet. The silicone rubber tube 130 is disposed over an exterior of the insulation sleeve 116, and an outer circumferential surface of the silicone rubber tube 130 is provided with a plurality of umbrella-shaped projections 132. The stress control cone 124 is received within the insulation sleeve 116 and is fitted over a power cable 100 inserted into the insulation sleeve 116, so as to prevent a local electric field concentration from occurring at a cutting end surface formed after cutting a shielding layer (for example, a metal shielding layer) of the power cable 100.

In the embodiment of FIG. 1, the power cable 100 is inserted from the inlet of the insulation sleeve 116 and extends out from the outlet of the insulation sleeve 116, i.e. the power cable 100 runs through the whole insulation sleeve 116.

In an exemplary embodiment of the present invention, the insulation sleeve 116 is an epoxy sleeve made of an epoxy resin material.

Figure 2:
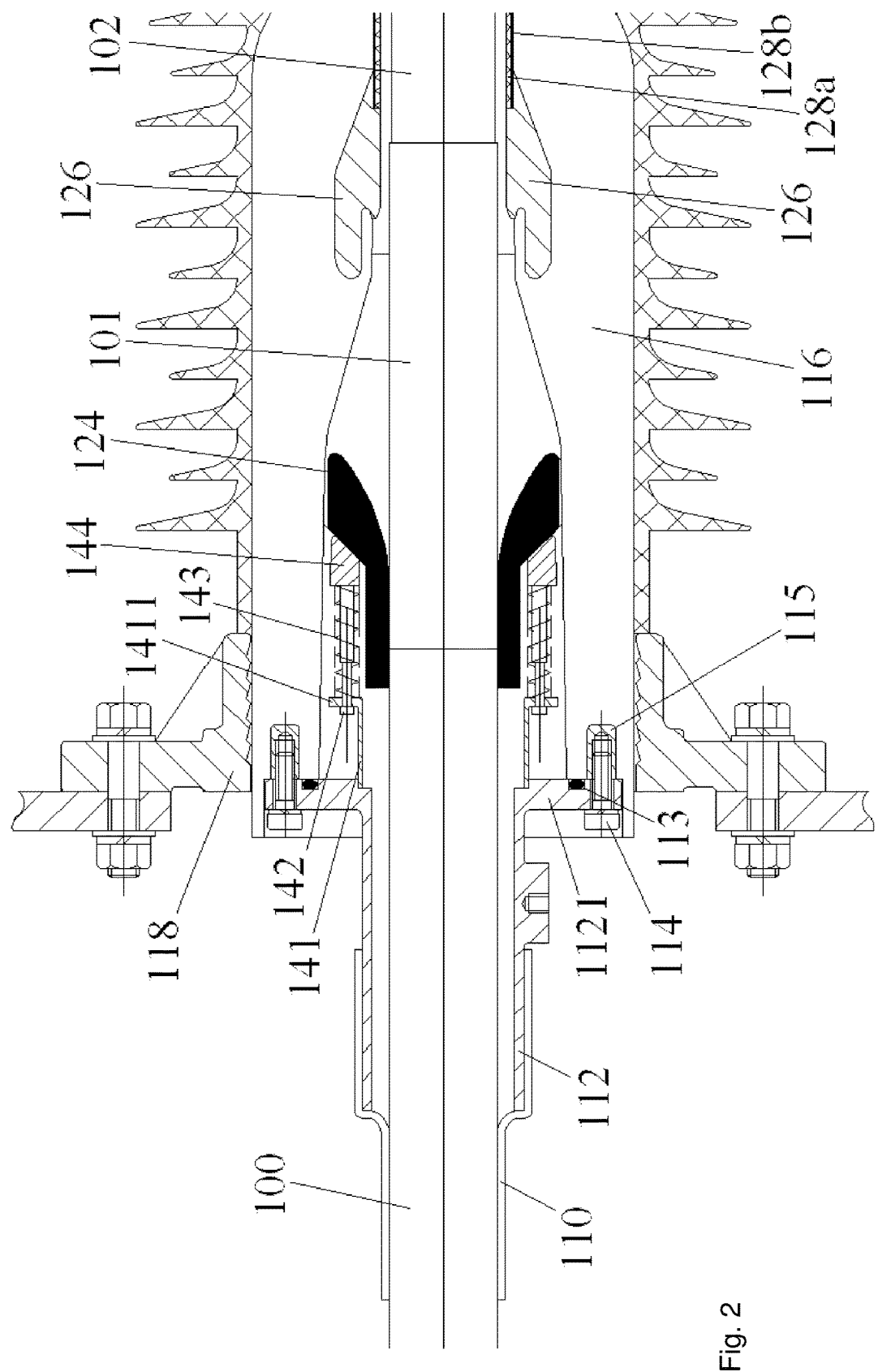
FIG. 2 is an enlarged illustrative view of a lower structure of the dry power cable termination of FIG. 1.

FIG. 2 is an enlarged illustrative view of a lower structure of the dry power cable termination of FIG. 1; and FIG. 3 is an enlarged illustrative view of an upper structure of the dry power cable termination of FIG. 1.

As illustrated in FIGS. 1, 2 and 3, in the illustrated embodiment, the dry power cable termination further comprises a shielding sleeve 128, an electrode 126, an electric connection assembly 137, 138 and 139, and a clamping pipe 136.

As illustrated in FIGS. 1, 2 and 3, the shielding sleeve 128 is received within the insulation sleeve 116 and is fitted over an exposed segment of an insulation layer 102 of the power cable 100, so as to achieve the recovery of shielding effect of the exposed segment of the insulation layer 102 of the power cable 100, and to prevent electric field concentration and local discharge from occurring, thereby improving the explosion-proof performance and safety performance of the dry power cable termination.

Continuing to refer to FIGS. 1, 2 and 3, the electrode 126 is received within the insulation sleeve 116 and is electrically connected to a first end (a lower end in FIG. 1) of the shielding sleeve 128, so as to prevent local electric field concentration from occurring at the first end of the shielding sleeve 128, thereby further improving the explosion-proof performance and safety performance of the dry power cable termination.

Continuing to refer to FIGS. 1, 2 and 3, the electric connection assembly 137, 138 and 139 is received within the insulation sleeve 116 and is used to electrically connect a second end of the shielding sleeve 128 opposite to the first end to an exposed segment of a conductor core 103 of the power cable 100, so as to prevent local electric field concentration from occurring at the second end of the shielding sleeve 128, thereby further improving the explosion-proof performance and safety performance of the dry power cable termination.

Continuing to refer to FIGS. 1, 2 and 3, the metal clamping pipe 136 is clamped over and electrically connected with the conductor core 103 of the power cable 100 extending out from the outlet of the insulation sleeve 116.

As shown in FIGS. 1, 2 and 3, in an exemplary embodiment of the invention, the exposed segment of the insulation layer 102 of the power cable 100 is fully covered by the electrode 126, the shielding sleeve 128 and the electric connection assembly 137, 138 and 139. That is to say, the electrode 126, the shielding sleeve 128 and the electric connection assembly 137, 138 and 139 fully covers the exposed segment of the insulation layer 102 of the power cable 100, so as to achieve the recovery of the shielding effect of the exposed segment of the insulation layer 102 of the power cable 100.

As shown in FIGS. 1, 2 and 3, in an exemplary embodiment of the present invention, an inner diameter of the shielding sleeve 128 is larger than an outer diameter of the insulation layer 102 of the power cable 100; in this way, there is a gap between the shielding sleeve 128 and the exposed segment of the insulation layer 102 of the power cable 100 so as to facilitate the insertion of the power cable 100 into the shielding sleeve 128.

As shown in FIGS. 1, 2 and 3, in an exemplary embodiment of the present invention, the power cable 100 further comprises a semi-conductive shielding layer 101 with segment thereof being exposed, and the exposed segment of the semi-conductive shielding layer 101 is fully covered by the electrode 126 and the stress control cone 124 so as to prevent a local electric field concentration from occurring at cutting end surfaces formed after cutting the shielding layers (for example, a metal shielding layer (not shown) and the semi-conductive shielding layer 101) of the power cable 100.

As shown in FIGS. 1, 2 and 3, in the illustrated embodiment, the shielding sleeve 128 comprises a plastic sleeve 128a and a shielding layer 128b. The shielding layer 128b is wrapped over an exterior of the plastic sleeve 128a. In an exemplary embodiment of the present invention, the plastic sleeve 128a may be a glass fiber enhanced epoxy sleeve, and the shielding layer 128b may comprise a metal shielding layer (such as, an aluminum layer) and a semi-conductive shielding layer (such as, a silicone rubber shielding layer).

However, the present invention is not limited to the illustrated embodiments therein. For instance, in another embodiment of the present invention, the shielding sleeve 128 may be a metal shielding sleeve, a semi-conductive shielding sleeve, or a compound shielding sleeve having a metal shielding layer and a semi-conductive shielding layer simultaneously.

As shown in FIGS. 1, 2 and 3, in an exemplary embodiment of the present invention, the electric connection assembly comprises: an electric shielding connection tube 137, one end of which is electrically connected to the shielding sleeve 128; an electric connection cover plate 138 covering an opening located at the other end of the electric shielding connection tube 137; and an electric connection screw 139 screwed into threaded holes in the electric shielding connection tube 137 and the electric connection cover plate 138, respectively, and electrically contacting with the exposed conductor core 103 of the power cable 100.

As shown in FIGS. 1, 2 and 3, in an exemplary embodiment of the present invention, the dry power cable termination further comprises a tail tube 112. The tail tube 112 is located outside of the insulation sleeve 116 and is fitted over the power cable 100, and one end of the tail tube 112 is hermetically connected to an end surface (a bottom end surface) at the inlet of the insulation sleeve 116.

As shown in FIGS. 1, 2 and 3, in an exemplary embodiment of the present invention, the tail tube 112 has a connection flange 1121 in which a threaded hole is formed. A threaded connection sleeve 115 is embedded in an end wall at the inlet of the insulation sleeve 116. connection screw 114 are screwed into the threaded holes in the connection flange 1121 as well as the threaded connection sleeve 115, so as to connect the one end of the tail tube 112 to the end surface at the inlet of the insulation sleeve 116.

As shown in FIGS. 1, 2 and 3, in an exemplary embodiment of the present invention, a sealing gasket 113 is provided between an end surface (an end surface of the connection flange 1121) at the one end of the tail tube 112 and the end surface (the bottom end surface) at the inlet of the insulation sleeve 116, so as to seal a mating interface between the end surface at the one end of the tail tube 112 and the end surface at the inlet of the insulation sleeve 116.

As shown in FIGS. 1, 2 and 3, in an exemplary embodiment of the present invention, the dry power cable termination further comprises a heat shrinkable tube 110. One end of the heat shrinkable tube 110 is hermetically fitted over the tail tube 112, and the other end thereof is hermetically fitted over the power cable 100, thereby sealing a gap between the tail tube 112 and the power cable 100. Before fitting the heat shrinkable tube 110 over the power cable 100, a sealing tape can be wrapped around the power cable 100 or a layer of sealing glue can be coated on the power cable 100 firstly, so as to improve the sealing performance.

As shown in FIGS. 1, 2 and 3, in an exemplary embodiment of the present invention, the dry power cable termination further comprises a spring compression device 140. The spring compression device 140 is received within the insulation sleeve 116 so as to tightly press the stress control cone 124 against an inner wall of the insulation sleeve 116.

As shown in FIGS. 1, 2 and 3, in an exemplary embodiment of the present invention, the spring compression device 140 comprises: a press tube 141, one end of which is pressed against the tail tube 112; a press block 144, one end of which is pressed against the stress control cone 124; and a press spring 143 provided between the press tube 141 and the press block 144 and having one end pressed against the press tube 141 and the other end pressed against the press block 144.

As shown in FIGS. 1, 2 and 3, in an exemplary embodiment of the present invention, the other end of the press tube 141 is provided with a flange portion 1411. The spring compression device 140 further comprises a positioning rod 142, which sequentially passes through a through-hole in the flange portion 1411 and through the press spring 143 (that is, the press spring is fitted over the positioning rod) and is connected to the press block 144.

As shown in FIGS. 1, 2 and 3, in an exemplary embodiment of the present invention, the dry power cable termination further comprises: a silicone rubber cap 134, one end (a lower end in FIG. 3) of which is fitted over the silicone rubber tube 130. An end 1361 of the clamping pipe 136 is fitted over the other end (an upper end in FIG. 3) of the silicone rubber cap 134.

As shown in FIGS. 1, 2 and 3, in an exemplary embodiment of the present invention, the dry power cable termination further comprises an installation substrate 118. The installation substrate 118 is threadedly connected to an outer circumferential surface at the inlet of the insulation sleeve 116. The dry power cable termination is mounted and supported on an installation bracket 120 through the installation substrate 118. As shown in FIG. 1, the installation substrate 118 is mounted and supported on the installation bracket 120 through screw bolts 122.

In the illustrated embodiment, as shown in FIGS. 1, 2 and 3, the installation substrate 118 and the tail tube 112 are electrically insulated from each other by the insulation sleeve 116. Thus, there is no High-Voltage present on the installation substrate 118. Thus, there is no need to mount multiple insulators on the installation substrate 118, thereby further reducing the cost of the dry power cable termination.

As shown in FIG. 1, in an exemplary embodiment of the present invention, the insulation sleeve 116 has three portions with different diameters: a first portion for receiving the stress control cone 140 and the electrode 126; a second portion for receiving the shielding sleeve 128 and having a diameter smaller than that of the first portion; and a tapered transition portion transitioning from the first portion to the second portion. With the insulation sleeve 116 having multiple segments with different diameters, the material for producing the insulation sleeve 116 can be saved so as to further reduce the cost.

It should be appreciated for those skilled in this art that the above embodiments are all exemplary embodiments. For example, many modifications may be made to the above embodiments by those skilled in this art, and various features described in different embodiments may be freely combined with each other without conflicting in configuration or principle.

Although the present disclosure has been described with reference to the attached drawings, the embodiments disclosed in the attached drawings are intended to describe the preferred embodiments of the present invention exemplarily, but should not be construed as a limitation to the present disclosure.

Although several embodiments of the general concept of the present disclosure have been shown and described, it would be appreciated by those skilled in the art that various changes or modifications may be made in these embodiments without departing from the principles and spirit of the disclosure, the scope of which is defined in the claims and their equivalents.

In the various embodiments of the dry power cable termination of the present invention, the power cable runs through the whole insulation sleeve of the dry power cable termination, and the conductor core of the power cable extends out from the outlet of the insulation sleeve and is directly electrically connected with the clamping tube. Thus, in the present invention, there is no need to provide a copper rod for being electrically connected with the conductor core of the power cable in the insulation sleeve, and there is also no need to provide a copper connection-peg for connecting the copper rod to the conductor core in the insulation sleeve. Thus, the present invention reduces the cost of the dry power cable termination. Furthermore, in the present invention, there is also provided a shielding sleeve fitted over the power cable in the insulation sleeve such that the recovery of the shielding effect of the power cable is achieved, the electric filed concentration and local discharge can effectively prevented, and the explosion-proof performance and safety performance of the power cable can be improved. Furthermore, since the installation substrate and the tail tube are electrically insulated from each other by the insulation sleeve, there is no need to mount multiple insulators on the installation substrate of the dry power cable termination, so as to further reduce the cost of the dry power cable termination.

As used herein, term "comprising" or "having" should be understood as not excluding other elements or steps, and term "a" or "an" should be understood as not excluding plural elements or steps. In addition, any reference numeral in claims should not be understood as the limitation of the scope of the present disclosure.

What is claimed is:

1. A dry power cable termination, comprising:
   an insulation sleeve having an inlet and an outlet opposite to the inlet;
   a silicone rubber tube disposed over an exterior of the insulation sleeve;
   a stress control cone disposed within the insulation sleeve and fitted over a power cable so as to prevent a local electric field concentration from occurring at a cutting end surface formed by cutting a shielding layer of the power cable,
   a shielding sleeve received within the insulation sleeve and disposed over an exposed segment of an insulation layer of the power cable;
   an electrode received within the insulation sleeve and electrically connected to a first end of the shielding sleeve, so as to prevent a local electric field concentration from occurring at the first end of the shielding sleeve;
   an electric connection assembly received within the insulation sleeve and used to electrically connect a second end of the shielding sleeve opposite to the first end to an exposed segment of a conductor core of the power cable; and
   a clamping pipe being clamped over the conductor core of the power cable extending out from the outlet of the insulation sleeve.

2. The dry power cable termination of claim 1, wherein the exposed segment of the insulation layer of the power cable is fully covered by the electrode, the shielding sleeve and the electric connection assembly.

3. The dry power cable termination of claim 2, wherein an inner diameter of the shielding sleeve is larger than an outer diameter of the insulation layer of the power cable.

4. The dry power cable termination of claim 1, wherein the power cable further comprises a semi-conductive shielding layer with a segment thereof being exposed, and the exposed segment is fully covered by the electrode and the stress control cone.

5. The dry power cable termination of claim 1, wherein the shielding sleeve comprises: a plastic sleeve; and
   a shielding layer disposed over an exterior of the plastic sleeve.

6. The dry power cable termination of claim 5, wherein the plastic sleeve is a glass fiber enhanced epoxy sleeve, and the shielding layer comprises a metal shielding layer and a semi-conductive shielding layer.

7. The dry power cable termination of claim 1, wherein the shielding sleeve is a metal shielding sleeve andor a semi-conductive shielding sleeve.

8. The dry power cable termination of claim 1, wherein the electric connection assembly comprises: an electric shielding connection tube, one end of the electric shielding connection tube being electrically connected to the shielding sleeve;
   an electric connection cover plate covering an opening located at the other end of the electric shielding connection tube; and
   an electric connection screw screwed into threaded holes in the electric shielding connection tube and the electric connection cover plate and electrically contacted with the exposed conductor core of the power cable.

9. The dry power cable termination of claim 1, further comprising a tail tube located outside of the insulation sleeve and fitted over the power cable, one end of the tail tube being hermetically sealed to an end surface at the inlet of the insulation sleeve.

10. The dry power cable termination of claim 9, wherein a sealing gasket is provided between an end surface at the one end of the tail tube and the end surface at the inlet of the insulation sleeve, so as to seal a mating interface therebetween.

11. The dry power cable termination of claim 10, wherein the tail tube has a connection flange formed with a threaded hole therein;
   a threaded connection sleeve is embedded in an end wall at the inlet of the insulation sleeve and a connection screw is screwed into the threaded hole in the connection flange as well as into the threaded connection sleeve, so as to connect the one end of the tail tube to the end surface at the inlet of the insulation sleeve.

12. The dry power cable termination of claim 9, further comprising a heat shrinkable tube, one end of the heat shrinkable tube being hermetically sealed over the tail tube, and the other end of the heat shrinkable tube being hermetically sealed over the power cable, so as to seal a gap therebetween.

13. The dry power cable termination of claim 12, further comprises a spring compression device received within the insulation sleeve so as to tightly press the stress control cone against an inner wall of the insulation sleeve.

14. The dry power cable termination of claim 13, wherein the spring compression device comprises:
   a press tube, one end of the press tube being pressed against the tail tube;
   a press block, one end of the press block being pressed against the stress control cone; and
   a press spring provided between the press tube and the press block, one end of the press spring being pressed against the press tube and the other end of the press spring being pressed against the press block.

15. The dry power cable termination of claim 14, wherein the other end of the press tube is provided with a flange portion, and the spring compression device further comprises a positioning rod sequentially passing through a through-hole in the flange portion and through the press spring, and being connected to the press block.

16. The dry power cable termination of claim 9, further comprising an installation substrate threadedly connected to an outer circumferential surface at the inlet of the insulation sleeve,
    wherein the dry power cable termination is mounted and supported on an installation bracket through the installation substrate.

17. The dry power cable termination of claim 16, wherein the installation substrate and the tail tube are electrically insulated from each other by the insulation sleeve.

18. The dry power cable termination of claim 1, further comprising a silicone rubber cap, one end of the silicone rubber cap being fitted over the silicone rubber tube; wherein an end of the clamping pipe is fitted over the other end of the silicone rubber cap.

19. The dry power cable termination of claim 1, wherein the insulation sleeve comprises:
    a first portion for receiving the stress control cone and the electrode;
    a second portion for receiving the shielding sleeve and having a diameter smaller than that of the first portion; and
    a tapered transition portion transitioning from the first portion to the second portion.

20. The dry power cable termination of claim 1, wherein an outer circumferential surface of the silicone rubber tube is provided with a plurality of umbrella-shaped projections.

\* \* \* \* \*

UNITED STATES PATENT AND TRADEMARK OFFICE
CERTIFICATE OF CORRECTION

PATENT NO. : 10,236,672 B2
APPLICATION NO. : 15/412705
DATED : March 19, 2019
INVENTOR(S) : Yuezhong Tan et al.

It is certified that error appears in the above-identified patent and that said Letters Patent is hereby corrected as shown below:

In the Claims

In Column 8, Line 6, Claim 7, "metal shielding sleeve andor" should read -- metal shielding sleeve and/or --

Signed and Sealed this
Eleventh Day of February, 2020

Andrei Iancu
*Director of the United States Patent and Trademark Office*